United States Patent [19]

Ojima

[11] Patent Number: 4,993,994
[45] Date of Patent: Feb. 19, 1991

[54] SEALING CONSTRUCTION OF A TENSIONER

[75] Inventor: Juji Ojima, Aikawa, Japan

[73] Assignee: NHK Spring Co., Ltd., Yokohama, Japan

[21] Appl. No.: 448,085

[22] Filed: Dec. 12, 1989

[30] Foreign Application Priority Data

Dec. 30, 1988 [JP] Japan ............................... 63-331598

[51] Int. Cl.$^5$ ............................................. F16H 07/08
[52] U.S. Cl. ...................................... 474/111; 474/91; 220/307
[58] Field of Search ......................... 474/91, 101, 111; 220/306, 307; 222/563, 564

[56] References Cited

U.S. PATENT DOCUMENTS

| 4,702,726 | 10/1987 | Ojima et al. | 474/101 |
| 4,736,865 | 4/1988 | Rericha | 220/307 |
| 4,809,872 | 3/1989 | Pavur | 220/307 |

Primary Examiner—Ramon S. Britts
Assistant Examiner—Terry Lee Melius
Attorney, Agent, or Firm—Fleit, Jacobson, Cohn, Price, Holman & Stern

[57] ABSTRACT

The sealing of an inserting hole portion of a casing base portion side is performed by an elastic sealing member. In a tensioner in which a rotation body and urged body are provided within the casing in a screwed state and the urged body advances in an axial direction by the rotation of the rotation body by a spring force, the elastic sealing member includes a body portion closely adhered to an inner circumferential surface of an inserting hole formed in the casing and a guide portion closely adhered to the inner and the outer surfaces of the casing formed at opposite ends of the body portion and is inserted into the inserting hole, and further provided with a penetrated hole to insert a pushing jig thereinto.

1 Claim, 2 Drawing Sheets

SEALING CONSTRUCTION OF A TENSIONER

BACKGROUND OF THE INVENTION

This invention relates to a tensioner which provides a fixed stress to a belt, chain or the like to drive a cam shaft of an engine in a car or the like, and especially relates to a sealing construction which prevents the leakage of a lubricant oil filled in the inner portion thereof.

Generally, a tensioner, such as a belt tensioner or a chain tensioner, is used to an engine. The tensioner operates to keep a fixed stress, to press the belt or the chain in a certain direction directly or indirectly when the chain or the belt slackens by extension or friction of the belt or the chain. Further, in order to perform this operation smoothly, the tensioner is filled with a lubricant oil. Accordingly, the inner portion of the tensioner is provided with a sealing construction in order to maintain a sealing state.

FIG. 4 shows a conventional tensioner having this sealing construction, wherein a rotation body 2 and an urged body 3 are provided in a screwed state in a casing. The interior of the casing 1 is hollow and a front and rear end portions thereof are opened respectively. The rotation body 2 and the urged body 3 are inserted into the casing 1 from the front opening portion. In this case, a coil spring 4 is outwardly inserted into the rotation body 2. One end 4a of the coil spring 4 is inserted into a long groove 1a formed at the casing 1 and another end portion 4b is inserted into a slit 2a formed at the base portion of the rotation body 2, thereby energizing the rotation of the rotation body 2. The urged body 3 engaged within rotation body 2 insertingly penetrate a bearing member 5 attached to the top end side of the casing 1. The rotation of the rotation body being restrained by a contact with bearing member 5. In such a construction, when the rotation body 2 is rotated by the spring force of the coil spring 4, the rotation force thereof is converted to a propelling force of the urged body 3 to advance the urged body 3 in an axial direction, and the slackening of the chain or the belt is corrected by the abutment of the urged body 3.

The sealing construction is performed with respect to the top end side and the base end side of the casing 1. The sealing construction of the top end side is performed by attaching a cap 6 at the top end portion of the urged body 3 and bridging an elastic boot between cap 6 and casing 1. On the other hand, the sealing construction of the base side is performed by using a seal bolt 8. The seal bolt 8 is screwed with an inserting hole 1b formed at the base end side of the casing 1 and a seal spacer 10 and a washer 9 are inserted between seal bolt 8 and casing 1 to keep the sealing with security. Further, to form the inserting hole 1b at the base side of the casing 1 requires the insertion of a jig for clamping the coil spring 4 against the rotation of the rotation body 2.

The traditional tensioner having such construction have the following problems;

(1) It is necessary to provide a tap working to an inserting hole 1b of the casing 1 in order to screw the seal bolt 8. However, this working is very troublesome.
(2) It is necessary to use sealing spacer 10 and the washer 9 in addition to the seal bolt 8 to the base side of the casing 1. Accordingly, the number of parts are excessive. Further, the weight of the tensioner becomes excessively heavy due to the weight of the seal bolt.
(3) The tightness of the seal bolt is apt to slacken easily due to the vibration, thereby decreasing its sealing ability at the base side of the casing.
(4) The screwing operation of the seal bolt is troublesome.

BRIEF DESCRIPTION OF THE INVENTION

The object of this invention is to provide a tensioner having a sealing construction which overcomes the above-mentioned problems.

In this invention, the sealing of the inserting portion at the casing base side is performed by a sealing member. Further in this tensioner, the rotation body and the urged body are provided in the casing in a screwed state, and the urged body advances in the axial direction by the rotation of the rotation body due to a spring force. The sealing member is an elastic body. Furthermore, the tensioner is provided with an inserting hole formed in the casing and a sealing member having a body portion closely attached to the inner circumferential surface of the casing and a guard portion closely attached to the inner and outer faces formed at both ends of the body portion and being inserting holes, said sealing member being formed a penetrated hole. The sealing member performing a sealing function by being closely attached to the whole inserting hole of the casing and the circumference thereof due to its elasticity.

DETAILED DESCRIPTION OF THE INVENTION

Now, referring to a preferred embodiment of this invention according to the accompanying drawings.

Figure 1:
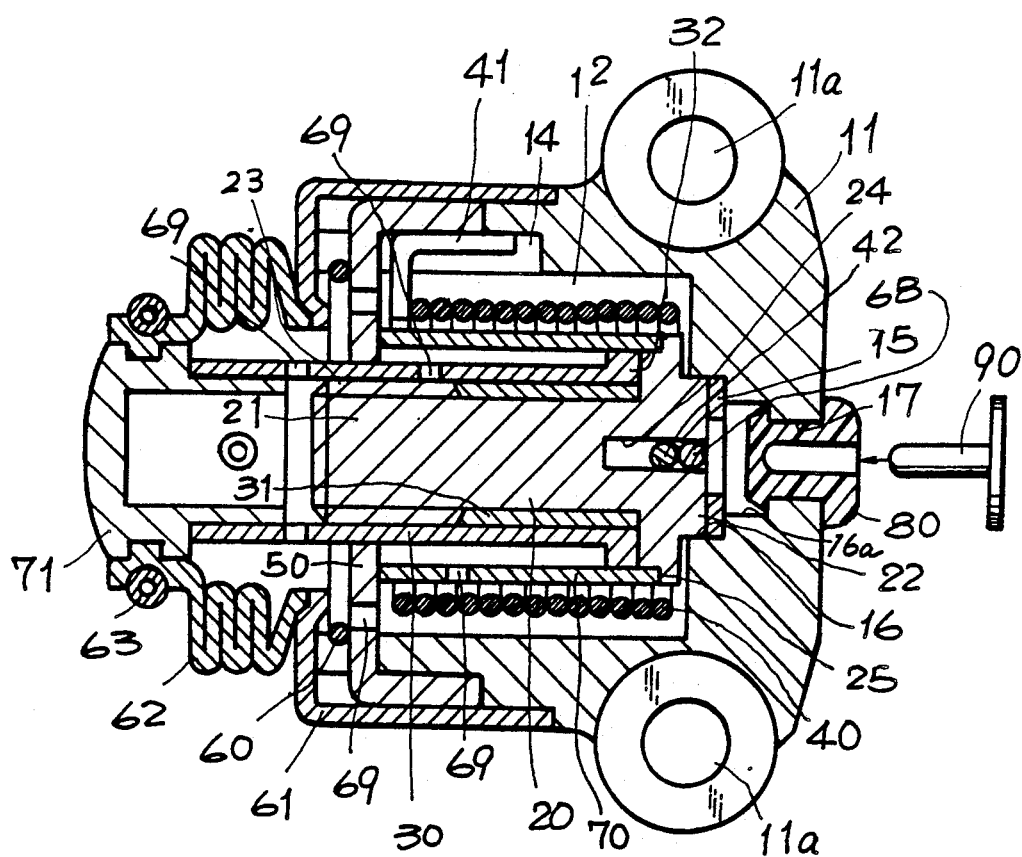
FIG. 1 and FIG. 2 are a cross sectional view and a side view of an example according to this invention, respectively.
Figure 2:
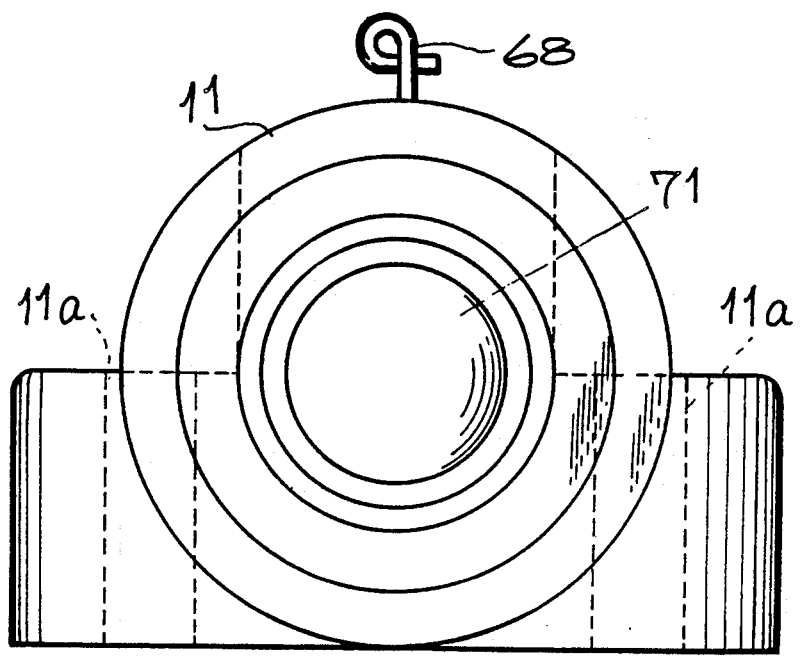

FIG. 1 is a sectional view of an example of the tensioner of this invention. FIG. 2 is a side view thereof. An empty cavity portion 12 is formed in an axial direction in a casing 11 with an attaching hole 11a to attach the engine or the like. Within said cavity portion is located a rotation body 20, an urged body 30 and a coil spring 40. The axial portion 21 of the rotation body 20 is screwed into the urged body 30. A fixed portion 22 of the base side (right side) of the rotation body 20 being inserted into a dent portion 16 formed at the base end portion of the cavity portion 12 together with a washer 15 to be rotatively supported. In this case, the axial portion 21 of the rotation body 20 is provided with a male screw portion 23 about its whole outer circumference. On the other hand, in the urged body 30, a female screw threaded portion 31 screwed with a male screw portion 23 of the rotation body 20 is formed at a portion of the inner circumference thereof. Further a bearing member 50 is attached to the top end portion (left end portion) of the casing 11.

The bearing, member 50 is provided with a bearing hole at a central portion therof. An extended portion of the bearing member extending toward the outside of the casing from the bearing hole extended portion being the outside of the casing and inserted into a inserted groove formed at fixed intervals at the top end portion of the casing 11. By this, the bearing member 50 is fixed in casing 11 without any rotation. The bearing hole is bored to be a non-circular form such as in the shape approximately of a small ellipse shape consisting of two parallel lines and an arc line which connects these parallel lines. The urged body 30 is inserted into this bearing hole and slides in a rotation restraining state. For this purpose, since the outer shape of the urged body 30 is cut complementary to the bearing hole of the bearing member 50 so that approximately the whole length of the urged body 30 may be insertable into the bearing hole, the stroke length of the urged body 30 can be reduced sufficiently, At the base end portion of the urged body 30 is formed a stopper flange 32 having a large diameter The advancement of the urged body 30 is stopped by the abutment of the stopper flange 32 to the bearing member 50 whereby the withdrawing of the urged body is prevented.

The coil portion of the coil spring 40 is inserted into the urged body 30, one end 41 thereof being bent in the axial direction of the casing 11 and inserted into a long groove 14 formed at the cavity portion 12 of the casing 11.

On the other hand, another end 42 of the coil spring 40 is a slit 24 formed in the fixed portion 22 of the rotation body 20.

By this, the rotation body 20 is rotated by the coil spring 40 whereby the urged body 30 is adapted to be driven so as to advance a straight direction. In this situation, the slit 24 is used for rotating the rotation body 20 by inserting a tool to windingly clamp the coil spring 40. In such a construction wherein the rotation body 20 is inserted into the urged body 30 and the urged body 30 is inserted into the coil spring 40, the length of the device in the axial direction or the length in the stress controlling direction is shortened, thereby being able to minimize the length of the device.

The sealing at the top end side of the casing 11 is performed by boot 62. In other words, a cap 71 is inserted into the top end portion of the urged body 30, the top end surface thereof being adapted to abut against the belt directly or indirectly. The attachment of the cap 71 is performed by inserting it in the top end of the urged member 30 and then forcibly inserting a spring pin between the urged body 30 and the cap 71 to prevent the urged body from being withdraw. The top end portion of the elastic boot 62 is fixed to the cap 71 by the insertion of a garter spring 63, the base portion of the boot 62 being adhered to a cover 61 inserted into the top end portion of the casing 11. By this, the top end portion of the casing 11 is covered and sheltered from outside.

The sealing at the base end side of the casing 11 is performed by the sealing member 80. As described above, a jig for windingly clamping, such as a driver, which clamps the coil spring windingly by rotating the rotation body, is inserted from the base end portion of the casing 11. For this purpose, an inserting hole 17, for inserting the jig, is formed at the base end portion of the casing 11, and the sealing member 80 is inserted into this inserting hole 17.

Figure 3:
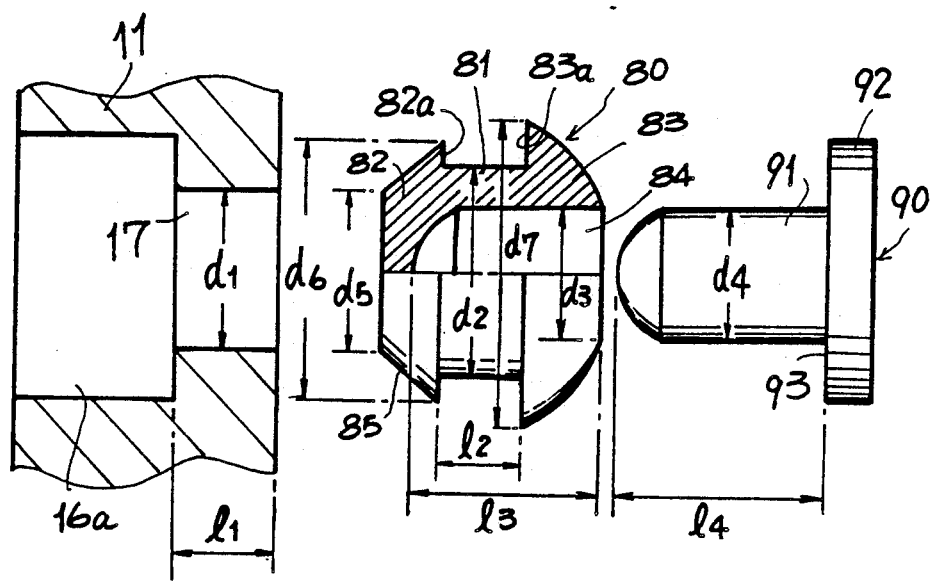
FIG. 3 is an example of a cross-sectional view of a material portion and FIG. 4 is a cross sectional view of a traditional device.
Figure 4:
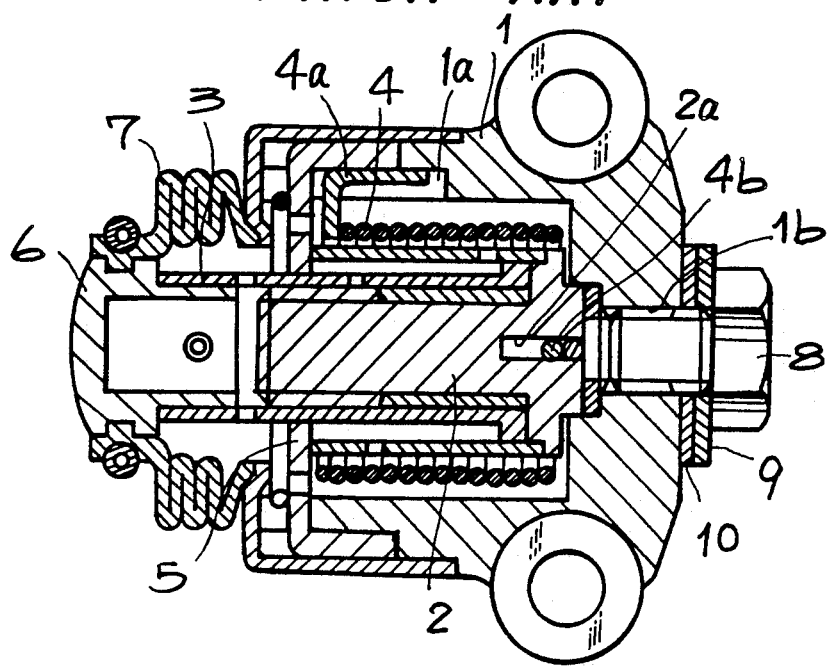

The sealing member 80 consists of an elastic member such as rubber or plastic and is formed to a shape and a dimension described hereafter. For insertion of the sealing member 80 into the inserting hole 17, a jig 90 for pressing is used. FIG. 3 shows the shape of the inserting hole 17, sealing member 80 and the pushing jig 90, said inserting hole 17 being formed to continuously connect with the dent portion 16 wherein the fixed portion 22 of the rotation body 20 and of the washer 15 are inserted thereinto through an intermediate hole 16a.

The intermediate hole 16a is smaller than the dent portion 16 in diameter and larger than that of the inserting hole 17.

The member 80 consists of a body portion 81 and guard portions 82, 83 continuously connected to opposite end portions of the body portion 81.

Further a penetrated hole 84 is formed in the guard portion 83 and the body portion 81 and extends in the axial direction. In attaching the body portion 81 into the inner circumferential surface of the inserting hole 17, while the opposed surfaces 82a, 83a of the guard portions 82 and 83 are adapted to closely contact with the inner and the outer surfaces of the casing 11 around the inserting hole 17. Further, the guard portion 82 at a top end side includes a tapered surface 85 which becomes slender toward the top end. This is formed to prevent an irregular transformation of the sealing member 80 at the time of being forcibly inserted into the inserting hole 17.

The pushing jig 90 consists of an axial portion 91 for insertion into the penetrated hole 84 of the sealing member 80 and a flange portion 92 which extends in an orthogonal direction from this axial portion 91. The axial portion 91 applies an inserting force to the sealing member 80. The top end portion therof is formed in an arc shape good dispersion of the inserting force. The top end surface 93 of the flange portion 92 abuts against the guard portion 83 at the base side of the sealing member 80 at the time of forcible insertion of the sealing member 80.

As described hereafter, the sealing member 80 is formed so that the dimension of the outer shape may be larger than the inserting hole 17.

When the sealing member 80 is forcibly inserted into the inserting hole 17 by using pushing jig 90, an excess pushing force operates from the top end of axial portion 91 of whereby the sealing member 80 may be broken. The top end surface 93 of the flange portion 92 abuts against the guard portion 83 of the sealing member 80 at the time of forcible insertion to provide the pushing force to the whole sealing member 80, thereby preventing the protrusion of the axial portion 91.

The dimensions of these members and the operation thereof will be described.

When the hole diameter and the length of the inserting hole 17 are shown by $d_1$ and $l_1$ respectively against the diameter $d_5$ at the top end portion of the guard portion 82 of the top end side of the sealing member 80, maximum outer diameter thereof $d_6$, diameter $d_2$ at the body portion 81, hole diameter $d_3$ of the penetrated hole 84, max. outer diameter $d_7$ at the guard portion 83 of the base side, intervals $l_2$ between opposed surfaces 82a and 83a of the guard portions 82, 83 (length of body portion 81) and the length $l_3$ of the penetrated hole 84, if $d_1$, $d_5$ and $d_6$ are designed as follows $d_5 < d_1$, $d_6 > d_1$ The releasing of the sealing member 80 from the inserting hole 17 after the insertion of the sealing member 80 is prevented. Further, if $d_7$ and $d_1$ are designed as follows $d_7 > d_1$, the protrusion into the inserting hole 17 at the time of forcible insertion of the sealing member 80 is prevented. And if $d_6$, $d_1$, $d_7$ are designed $d_6 > d_1$, $d_7 > d_1$ and $l_1$, $l_2$ are designed to be $l_1 > l_2$, the sealing member 80 is inserted into the inserting hole 17 in a state having a slight tightness.

By this, the body portion 81 of the sealing member 80 is closely adhered to the inner circumferential surface of the inserting hole 17, and the opposed surfaces 82a, 83a of the guard portions 82, 83 are closely adhered to the inner and outer surfaces of the casing 11 around the inserting hole 17 respectively, thereby improving the sealing properties. In other words, the body portion 81 and the portions 82a, 83a of each guard portion 82, 83 become sealing portions. Accordingly, since the sealing area is larger, the sealing forces become larger. Therefore, the sealing construction wherein the sealing member 80 consisting of such an elastic member, has the following effect.

(1) Sealing properties increase because the sealing area is large.
(2) No necessity of a high working accuracy for the sealing member because the elasticity is used for sealing.
(3) No occurrence of slackness due to vibration because an elastic member is used for the sealing member.
(4) Sealing is possible by only a sealing member. There is no need of sealing a spacer and washers. The number of parts decreases and the weight becomes lighter.
(5) No necessity of tap working for screw cutting of the inserting hole 17.

Further, when the diameter of the axial portion 91 of the pushing member 90 is shown by $d_4$ and the length thereof is shown by $l_4$ with respect to the sealing member 80 of the above dimensions, if $d_3 \geq d_4$ and $l_4 > l_3$, the top end surface of the axial portion 91 in the pushing jig 90 abuts against the sealing member 80, thereby being able to push the sealing member. Such use of the pushing jig to the sealing member 80 enables the forcible insertion to the inserting hole 17 of the sealing member with one touch, which makes the attaching operation easy. Further, the pushing jig 90 may be removed from the sealing member 80 after pushing, but also may be left as it is.

Furthermore, the construction of the tensioner other than the above sealing construction will be described as follows.

In order to secure the lubrication of the lubricant oil, oil holes 69 are suitably formed in the urged body 30, bearing member 50 and a collar described hereafter. In this example, a cylindrical collar 70 is inserted between the urged body 30 and the coil portion of the coil spring 40. The collar 70 is not always necessary for a substantial functioning as a tensioner, but this installation prevents the contact to and cutting into the urged body 30 due to the bending of the coil portion of the coil spring 40 and makes the sliding of the urged body 30 smooth.

Such base end portion of the collar 70 is inserted into a step portion 25 formed at the outer circumference of the fixed portion 22 of the rotation body 20 to support the step portion.

The numeral 60 is a snap ring engaged at the top end surface of the casing 11 which prevents the coming off of the bearing member 50. Further, 68 is a stopper pin inserted into the casing 11 from the outside so as to be able to be inserted or pulled out, the top end thereof being adapted to be received within the slit 24 of the rotation body 20. By this, the rotation of the rotation body is locked in a state wherein the stopper pin is inserted.

In this state, when the stopper pin 68 is drawn out by fixing to the engine or the like, the rotation body 20 rotates by dint of coil spring 40 to advance the urged body 30, thereby urging the belt.

As described above, since this invention has such a construction wherein sealing is performed by inserting the sealing member consisting of an elastic member into an inserting hole at the base side of the casing in which a windingly clamping jig is inserted, a reliable sealing can be performed with a simple operation. Slackness due to vibration, does not occur, and also there is no need of a tap working to the inserting hole of the casing. The roughness of the surface working is absorbed by the tightness due to the elasticity of the sealing member. Accordingly, there is no need of working of the accuracy. Further, the sealing spacer and the washer are also not needed and the number of parts decreases.

What I claim is:

1. In combination, a sealing construction for a tensioner, wherein the tensioner includes a rotation body energized by a spring and an urged body advanced in an axial direction by the rotation of the rotation body in a screwed state in a casing, and a sealing member pressed into an inserting hole formed in the casing of the tensioner by using a pushing jig having a flange portion at one end of an axial portion, said sealing member of the tensioner being formed with an elastic body having a body portion closely adhered to an inner circumferential surface of the inserting hole, inner and outer guard portions closely adhered to an inner and an outer surface of the casing formed at opposite ends of the body portion, a penetrated hole for receipt of the axial portion of the pushing jig for pushing of the body portion, and a flanged end surface formed adjacent an opening portion of the penetrated hole providing a pushing force to the whole sealing member by the abutment of the flange surface of the pushing jig at a pushing time thereof since a length of the axial portion of the pushing jig is less than the length of the penetrated hole of the sealing member.

* * * * *